United States Patent
Rausch et al.

(10) Patent No.: US 7,270,362 B2
(45) Date of Patent: Sep. 18, 2007

(54) SEAT MODULE

(75) Inventors: Peter Rausch, Niederfuellbach (DE); Christina Schwerdtner, Neustadt (DE)

(73) Assignee: Brose Fahrzeugteile GmbH & Co., KG, Coburg, Coburg (DE)

( * ) Notice: Subject to any disclaimer, the term of this patent is extended or adjusted under 35 U.S.C. 154(b) by 1003 days.

(21) Appl. No.: 10/296,842

(22) PCT Filed: May 28, 2001

(86) PCT No.: PCT/DE01/02075

§ 371 (c)(1),
(2), (4) Date: Apr. 23, 2003

(87) PCT Pub. No.: WO01/89873

PCT Pub. Date: Nov. 29, 2001

(65) Prior Publication Data

US 2004/0075292 A1     Apr. 22, 2004

(30) Foreign Application Priority Data

May 26, 2000   (DE) ................... 100 27 063

(51) Int. Cl.
*B60N 2/02* (2006.01)
(52) U.S. Cl. .................. 296/65.11; 296/65.03
(58) Field of Classification Search ............ 296/65.11, 296/65.03, 65.05, 65.09
See application file for complete search history.

(56) References Cited

U.S. PATENT DOCUMENTS

| | | | | |
|---|---|---|---|---|
| 5,707,103 A | * | 1/1998 | Balk ........................... | 297/13 |
| 5,800,015 A | | 9/1998 | Tsuchiya et al. | |
| 5,921,606 A | * | 7/1999 | Moradell et al. ........ | 296/65.03 |
| 5,944,388 A | * | 8/1999 | Saucier et al. ........... | 296/65.01 |
| 5,951,086 A | * | 9/1999 | Hoshino et al. ......... | 296/65.03 |
| 5,951,104 A | * | 9/1999 | Tsuchiya et al. ........ | 296/65.09 |
| 6,039,401 A | * | 3/2000 | Rus ......................... | 296/65.03 |
| 6,065,804 A | * | 5/2000 | Tanaka et al. ........... | 296/65.03 |
| 6,155,626 A | * | 12/2000 | Chabanne et al. ....... | 296/65.03 |
| 6,161,892 A | * | 12/2000 | Chabanne et al. ....... | 296/65.03 |
| 6,334,601 B1 | * | 1/2002 | Hur et al. ................ | 296/65.03 |
| 6,663,157 B1 | * | 12/2003 | Hofmann et al. ........ | 296/65.03 |

(Continued)

FOREIGN PATENT DOCUMENTS

DE   198 35 831 A1   3/1999

(Continued)

OTHER PUBLICATIONS

English Translation of International Preliminary Examination Report of corresponding PCT/DE01/02075, dated Sep. 3, 2002.

(Continued)

*Primary Examiner*—Kiran B. Patel

(57) ABSTRACT

A seat module including at least one vehicle seat and a transverse guide is disclosed. The vehicle seat is connected through a vehicle body through a seat base, and is displaceable through a guide element along a transverse guide. When the vehicle seat is on a first side of the transverse guide, it is lockable relative to the transverse guide in a position of use, and when the vehicle seat is in a removal position on a second side of the transverse guide, it can be removed from the transverse guide when inclined or perpendicular to its normal extension direction.

39 Claims, 15 Drawing Sheets

U.S. PATENT DOCUMENTS

| | | | |
|---|---|---|---|
| 6,843,526 B2 * | 1/2005 | Honda et al. | 296/65.11 |
| 6,883,868 B2 * | 4/2005 | Yoshida | 296/65.13 |
| 7,152,925 B2 * | 12/2006 | Hur et al. | 296/65.03 |
| 2004/0017091 A1 * | 1/2004 | Hur et al. | 296/65.03 |

FOREIGN PATENT DOCUMENTS

| | | |
|---|---|---|
| EP | 0 970 844 A1 | 1/2000 |
| FR | 2 735 081 A1 | 12/1996 |
| JP | 10-181392 | 7/1998 |
| JP | 10-181392 A | 7/1998 |
| JP | 11-5477 | 1/1999 |
| JP | 0 970 844 A1 | 1/2000 |

OTHER PUBLICATIONS

International Search Report of PCT/DE01/02075, dated Oct. 16, 2001.
International Preliminary Examination Report of PCT/DE01/02075, dated Sep. 3, 2002.
Patent Abstract of Japan, publication number 10181392, published on Jul. 7, 1998, in the name of Honda Motor Co Ltd.
Patent Abstract of Japan, publication number 11005477, published on Jan. 12, 1999, in the name of Ikeda Bussan Co Ltd.

* cited by examiner

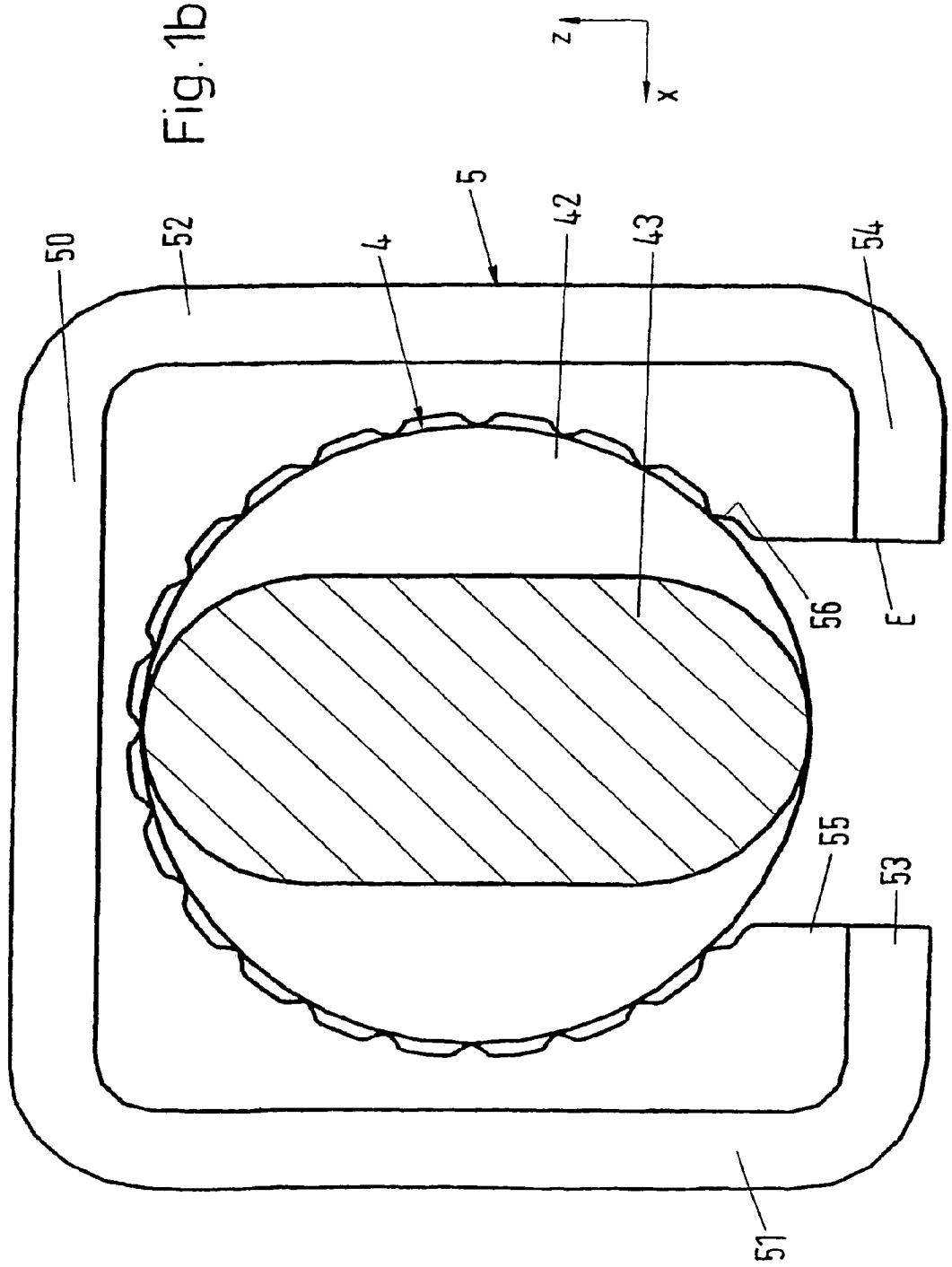

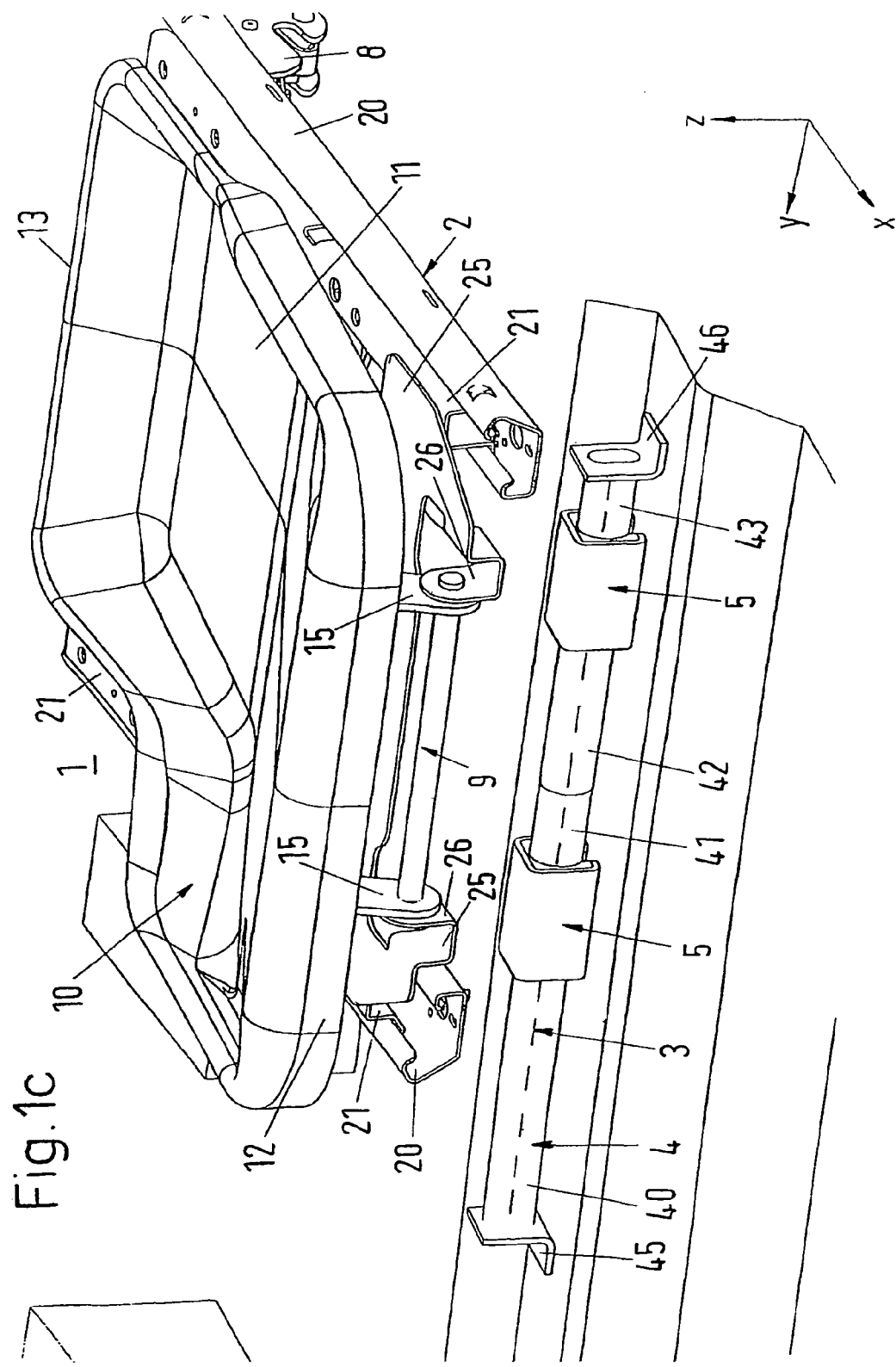

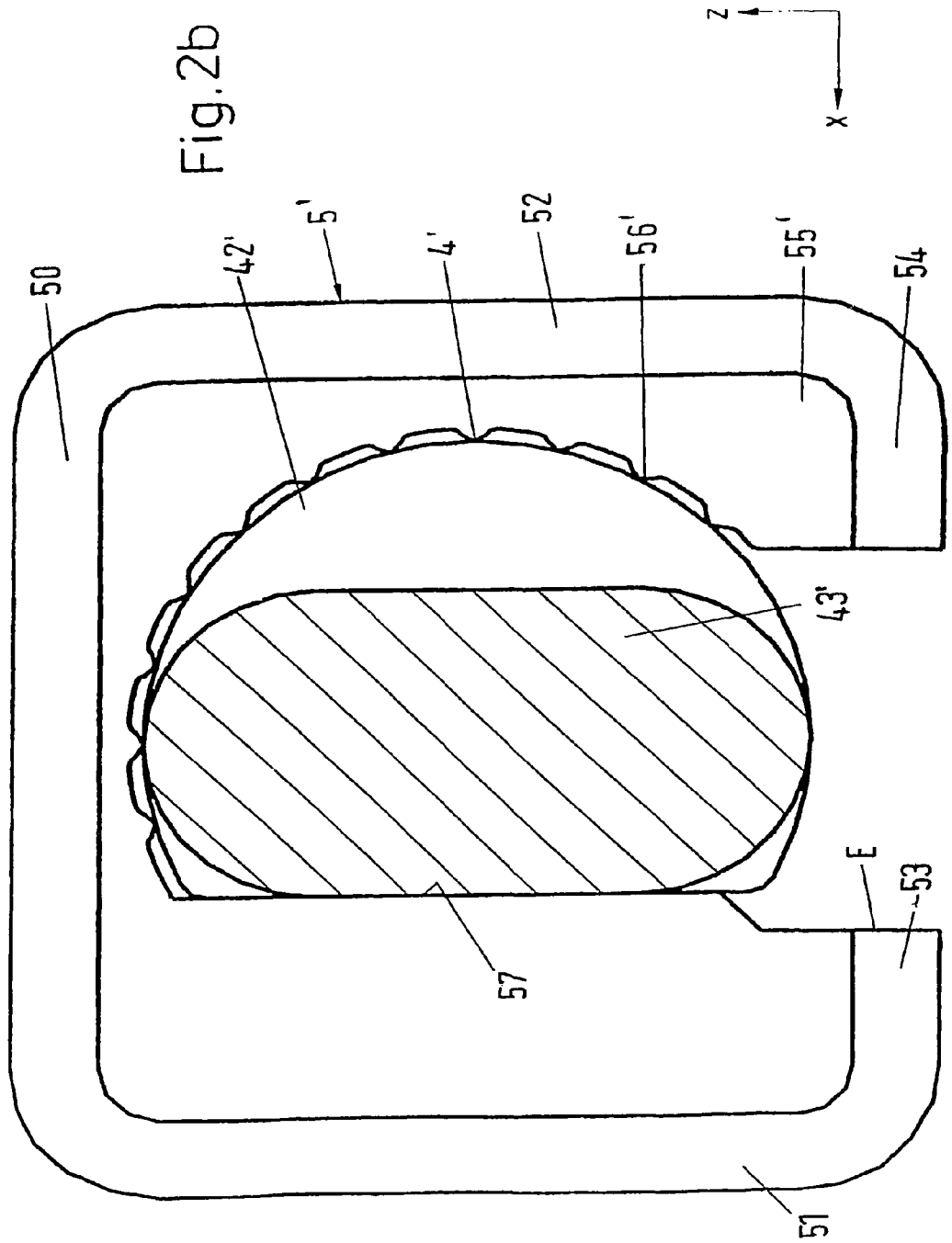

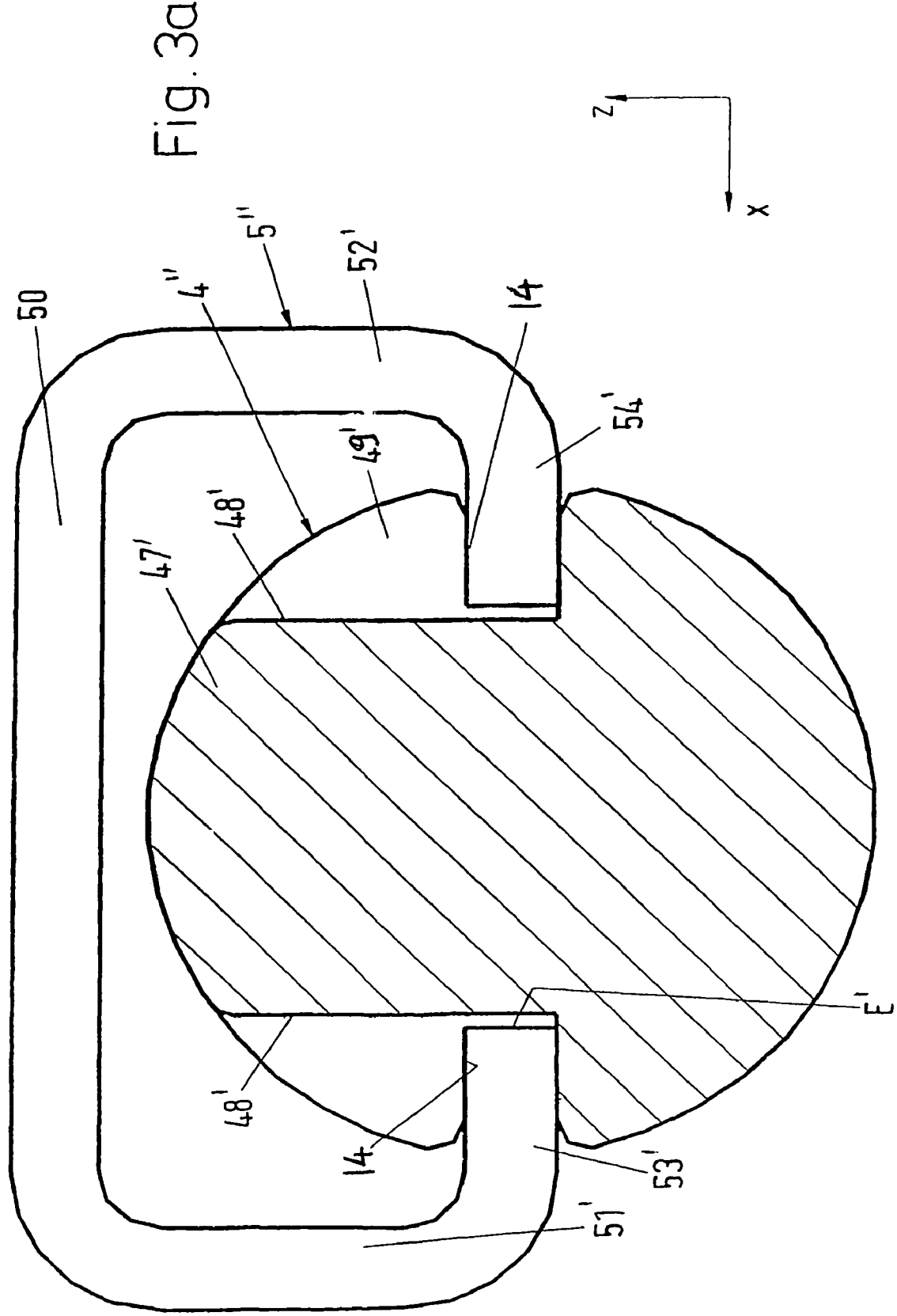

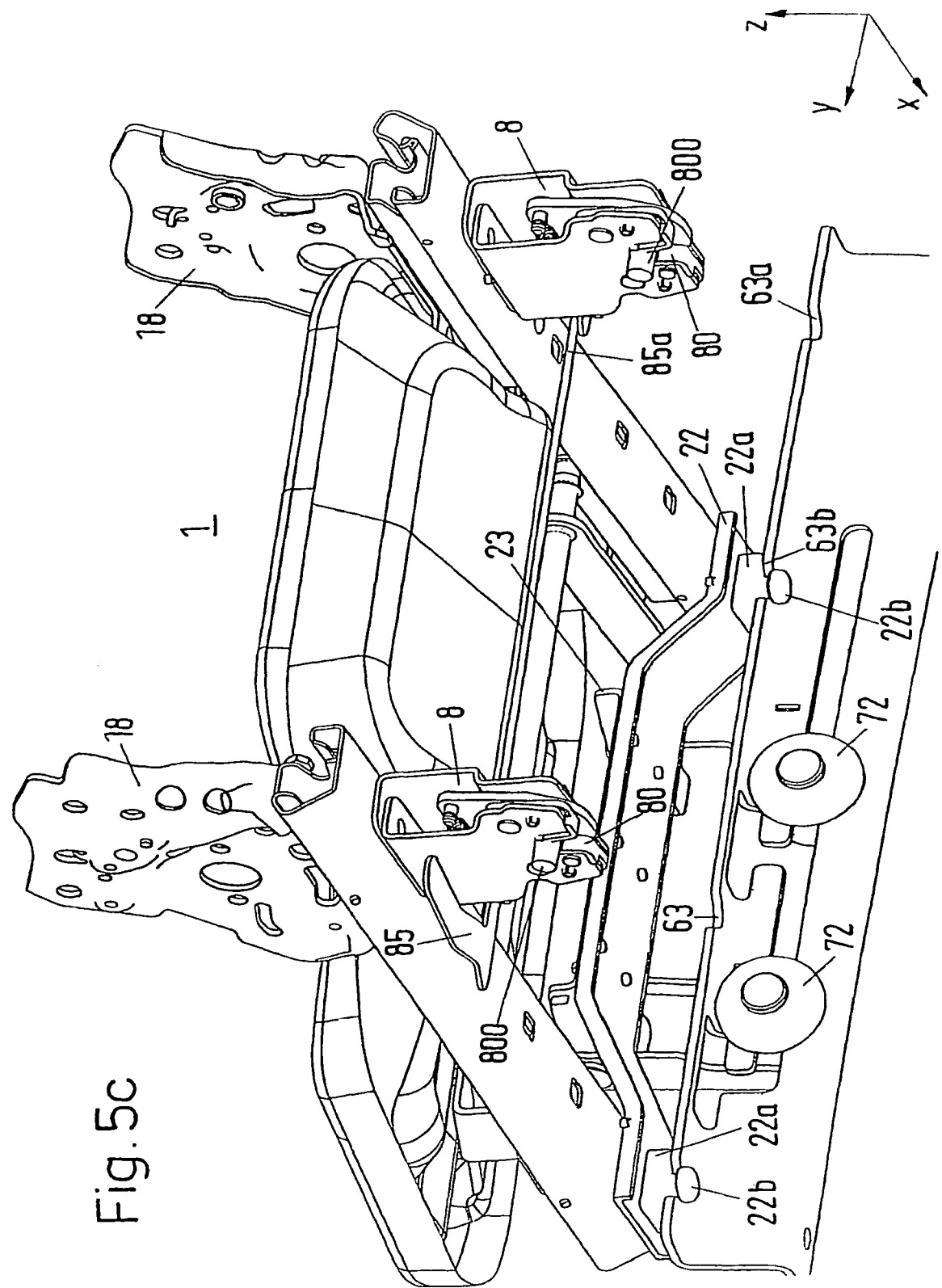

SEAT MODULE

CROSS-REFERENCE TO RELATED APPLICATION

This application is a National Phase Patent Application of International Application Number PCT/DE01/02075, filed on May 28, 2001, which claims priority of German Patent Application Number 100 27 063.8, filed on May 26, 2000.

FIELD OF THE INVENTION

The invention relates to a seat module with a vehicle seat.

BACKGROUND

A seat module is known, which includes at least one vehicle seat having a seat base through which the seat can be fixed on the floor of a vehicle body, and a transverse guide on which the seat can be displaced horizontally transversely to the longitudinal direction of the seat (i.e. in the y-direction of a motor vehicle). The seat is thereby lockable in at least one position of use relative to the transverse guide. The seat base can furthermore have in particular a longitudinal guide (rail guide) by means of which the seat can be moved in the longitudinal direction (corresponding to the longitudinal or drive direction of the vehicle in the installed state of the seat).

This seat module is particularly suitable for use as a rear seat of a motor vehicle. It enables one or more seats of the rear seat bench to be displaced on the transverse guide into different positions and then locked therein so that the storage space of the vehicle can be varied accordingly. This particularly applies if the rear bench seat of the motor vehicle includes several individual vehicle seats (more particularly, two or three vehicle seats) which can be removed individually from the vehicle. The remaining seat or remaining seats of the rear seat bench can then each be moved into different positions of use so that the loading space can be configured differently whilst passengers can still be transported in the back seats at the same time.

A seat module of this type is known from EP 0 970 844 A1. With the known vehicle seat the transverse mobility is achieved in that the seat has at its front end on each side a double-ended holding fork which engages hinge-like round a bolt section which is mounted locally fixed on the vehicle floor and serves as the transverse guide. Each of the two holding forks has a locking part which is formed like a rotary catch and in the locked state closes the forked opening formed between the forked ends so that the corresponding bolt section is completely enclosed by the forked ends and the locking part along its circumference. When the locking part is unlocked the forked opening is released so that the seat can be removed from the transverse guide and then from the vehicle.

This seat module has the drawback that a complicated lock structure is required in order to enable the seat to be removed from the vehicle.

SUMMARY

The object of the invention is therefore to provide a seat module in which the seat can be readily removed from the vehicle.

The current invention is directed to an improved seat module that allows easier removal of a seat from a vehicle. In one embodiment, at least one seat of the seat module is displaceable along the transverse guide out from its at least one position of use into a removal position which is different from the or each position of use (and is specially intended for detaching the seat) where it can be detached from the transverse guide and thereby removed from the motor vehicle.

The solution according to the invention is based on the knowledge that detaching the vehicle seat from the transverse guide and thus removing the seat from the motor vehicle can be made much easier if the seat is displaceable along the transverse guide into a position which is specifically intended for an easy release of the vehicle seat from the transverse guide.

In its at least one position of use, the seat is preferably not detachable from the transverse guide so that in this or these positions a secure fixing of the seat on the transverse guide is ensured.

According to one embodiment, the seat is displaceable along the transverse guide up to an end side of this guide where it can be detached from same if moved further in the extension direction of the transverse guide.

In a preferred embodiment the transverse guide and/or a guide element mounted on the seat side and displaceable on the transverse guide have a removal section, which, in at least one position of the seat relative to the transverse guide, allows the seat to be detached from the transverse guide inclined or perpendicular to its extension direction.

To this end the guide element can engage round the transverse guide and the removal section can be formed by a section of the transverse guide having a reduced cross-section. Conversely, or in addition, the guide element engaging round the transverse guide can have a section provided with a removal opening, so that in a certain position of the guide element relative to the transverse guide, the guide element can be detached from the transverse guide.

Preferably, the guide element and the transverse guide interact through a plastics coating, for example by providing the guide element with a plastics coating on its inner side facing the transverse guide so that the guide element is supported on the transverse guide without any rattling.

According to another embodiment, the transverse guide is formed in cross-section as a profiled part in which the at least one guide element on the seat side engages, or which is engaged by, the at least one guide element on the seat side, with the removal section being formed by a removal opening in the transverse guide. As an alternative, the removal section can be formed by a section of the guide element which is configured so that in certain relative positions of the guide element and transverse guide it enables the guide element to be detached from the transverse guide.

For a reliable rattle-free bearing, the guide element is preferably supported in two different directions on the transverse guide. To this end the guide element can include wheels or runners which are supported in different directions on the guide faces of the transverse guide. The transverse guide can have a suitable profiled section with corresponding guide faces which can serve as supporting faces for the wheels or runners.

The transverse guide can include a guide tube or a guide rail or a combination of guide tube and guide rail.

In order to lock the seat in its positions of use, the seat has a fastening device, e.g. in the form of fastening blocks on the rear seat end, through which the seat can be locked on the vehicle body. This fastening device can be completely independent of the transverse guide which preferably runs along the front seat end.

Apart from a fastening device of this kind which is independent of the transverse guide, securing elements can also be provided for fixing the seat in its positions of use relative to the transverse guide. For this, detent points can be provided on the transverse guide that interact with detent elements of the seat for fixing the seat in its positions of use.

Furthermore, the seat module can have a longitudinal seat adjuster that includes at least one pair of rails extending in the longitudinal direction of the seat, wherein the body-side rail of the rail pair is mounted displaceable on the transverse guide in its extension direction.

Furthermore, the seat module preferably has a swivel axis about which the seat surface of the at least one seat can swivel from its position of use into a substantially vertical position in order to gain further stowage space. When such seats are folded down in this way it is usually intended that the back rest is folded onto the seat surface before the seat surface is swivelled in the vertical position.

The swivel axis about which the seat surface can swivel into its substantially vertical position runs parallel to the transverse guide and more particularly along the same edge of the seat surface as the transverse guide. The swivel axis can hereby both coincide with the transverse guide and be spaced radially away from it.

Forming the swivel axis independent of the transverse guide is thereby particularly advantageous because this allows a greater freedom when configuring the transverse guide. These advantages when mounting the swivel axis at a distance from the transverse guide are provided independently of whether the seat module has the configuration indicated in claim 1. They can also be achieved with the seat module known from EP 0 970 844 A1. In one embodiment of the invention, the seat is only displaceable along the transverse guide if the seat surface has swivelled about the swivel axis out from its position of use. The seat surface need not necessarily have to be swivelled into its substantially vertical position; it is also possible for a smaller swivel movement of the seat surface to be sufficient to enable the seat to be displaced. Through such a measure it is ensured that little to no (unintended) displacement of the seat (e.g. in the event of a crash) along the transverse guide takes place if the seat surface is located in its substantially horizontal position of use.

In a corresponding way, it can be provided that the seat can only be detached from the transverse guide if the seat surface is swivelled about its swivel axis out from the position of use. It can hereby be expedient if detaching the seat from the transverse guide requires that the seat surface be swivelled further (e.g. up into the vertical position) than it be displaced.

In order to secure the seat after the seat surface has swivelled into a substantially vertical position at least one locking element can be provided which as the seat surface is swivelled into a substantially vertical position locks the seat in respect of moving along the extension direction of the transverse guide. Thus for example the seat section forming the seat surface can have a locking element which when the seat surface is swivelled into a substantially vertical position comes into engagement with the transverse guide and thereby locks the seat as far as moving along the transverse guide is concerned.

The locking element is preferably resiliently pretensioned towards its locking position in order to prevent the seat being locked by the locking element in positions other than in the substantially vertical position.

The movement of the locking element during swivelling of the seat surface is preferably controlled by a control member provided for this purpose.

According to another embodiment, a motor vehicle seat has a longitudinal seat adjuster for setting the longitudinal position of the seat and a tipping mechanism for swivelling the seat surface from its position of use into a substantially vertical position. The tipping mechanism is coupled with the longitudinal seat adjuster so that the seat surface can only then be swivelled into the substantially vertical position if the seat is located in predetermined definable longitudinal seat positions, more particularly in a rear longitudinal seat position.

This prevents the seat surface from colliding with the vehicle floor as it is folded round into a substantially vertical position if the seat surface is set in a front position in the longitudinal direction.

If the longitudinal seat adjuster includes in the normal way at least one pair of rails movable relative to each other in the longitudinal direction of the seat, then a part of the tipping mechanism with which the seat surface can be swivelled into its substantially vertical position is coupled to the first rail and another part is coupled to the second rail of the pair, whereby the two parts of the tipping mechanism can only interact with each other in certain predetermined longitudinal positions of the seat so that the seat surface can be folded down.

Thus, the tipping mechanism can include an unlocking mechanism that serves for unlocking a fixing device of the seat before the seat surface is swivelled into its substantially vertical position and that is connected on one hand to the first rail and on the other to the second rail of the rail pair. By way of example, an actuating element for unlocking the fastening device can be connected to the second rail and can only be brought into active connection with the part of the unlocking mechanism connected to the first rail for unlocking the fastening device, when the second rail is in a certain position relative to the first.

The actuating element can be coupled for example through hooks to a follower of the unlocking mechanism in order to unlock the fastening device.

Further features and advantages of the invention will now be described with reference to the embodiments illustrated in the drawings in which:

FIG. 1b shows a cross-section through the transverse guide of FIG. 1a;

FIG. 1c shows a modification of the embodiment of FIG. 1a wherein the seat can be detached from the transverse guide in the removal position without any previous swivel action of the seat surface;

FIG. 2b shows a cross-section through the transverse guide of the seat module of FIG. 2a;

FIG. 3a shows a cross-section through another embodiment of the transverse guide;

Figure 1A:
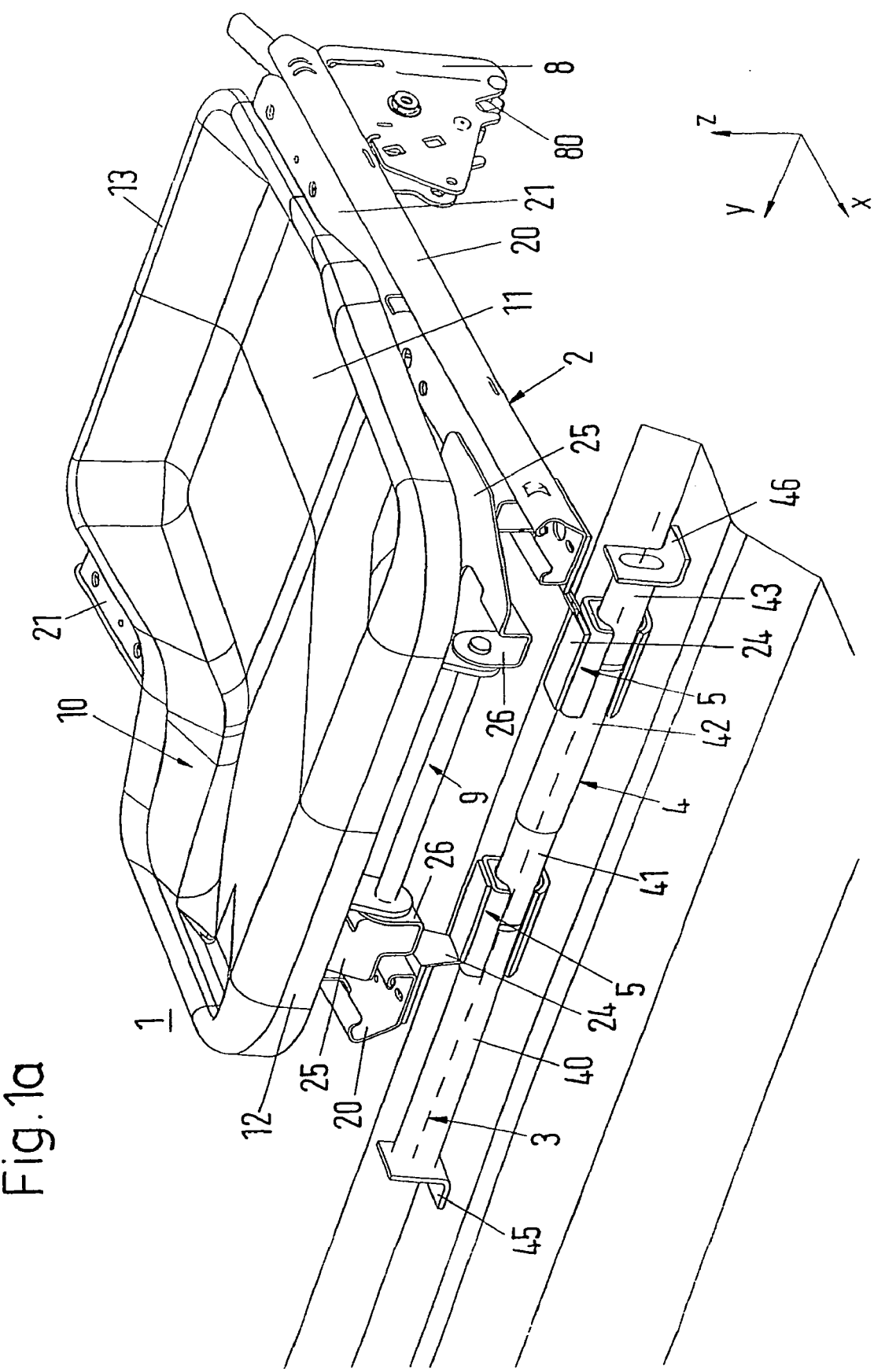
FIG. 1a shows a motor vehicle seat which is mounted displaceable on a transverse guide of a seat module wherein the seat is displaceable on the transverse guide into a removal position in which it can be removed from the transverse guide after the seat surface has been swivelled into a substantially vertical position.
Figure 5A:
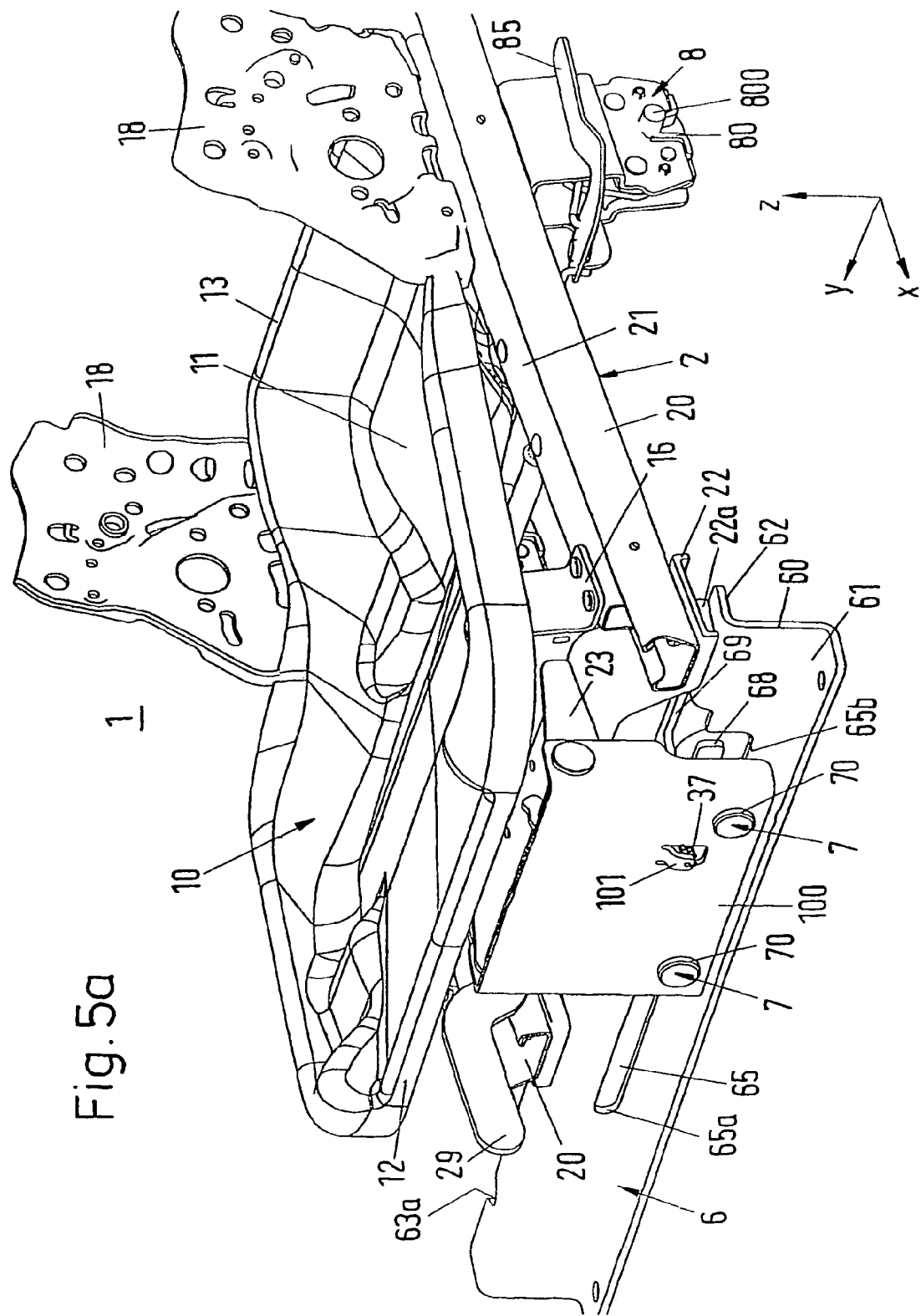
Figure 5B:
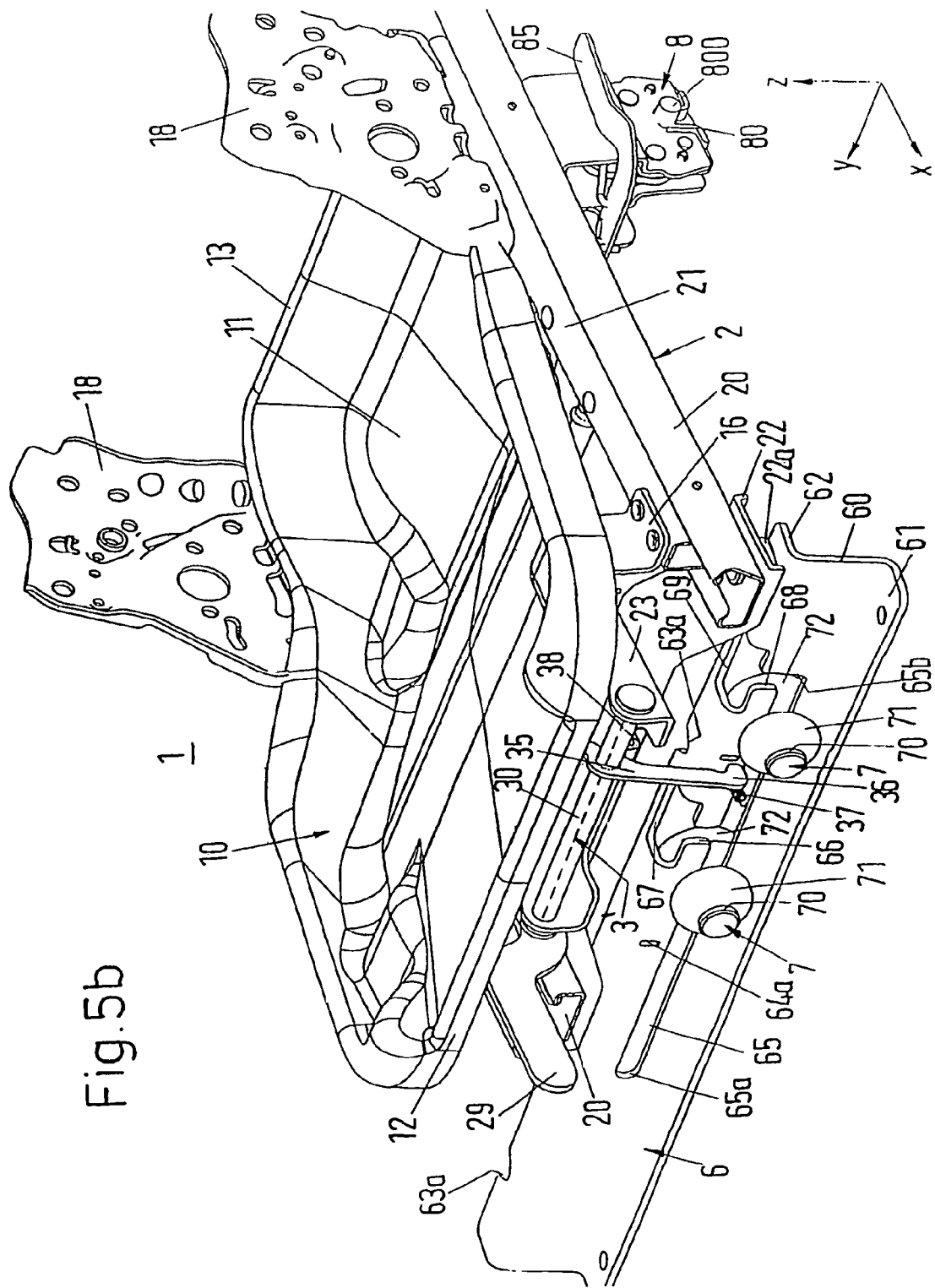

FIG. 5*a* shows a perspective view of a further modification of the embodiment of FIG. 1*a* in which the transverse guide is formed by a guide profile in which guide elements associated with the seat engage;

FIG. 5*b* shows another perspective view of the embodiment shown in FIG. 5*a*.

FIG. 5*c* shows yet another perspective view of the embodiment shown in FIG. 5*a*.

Figure 5D:
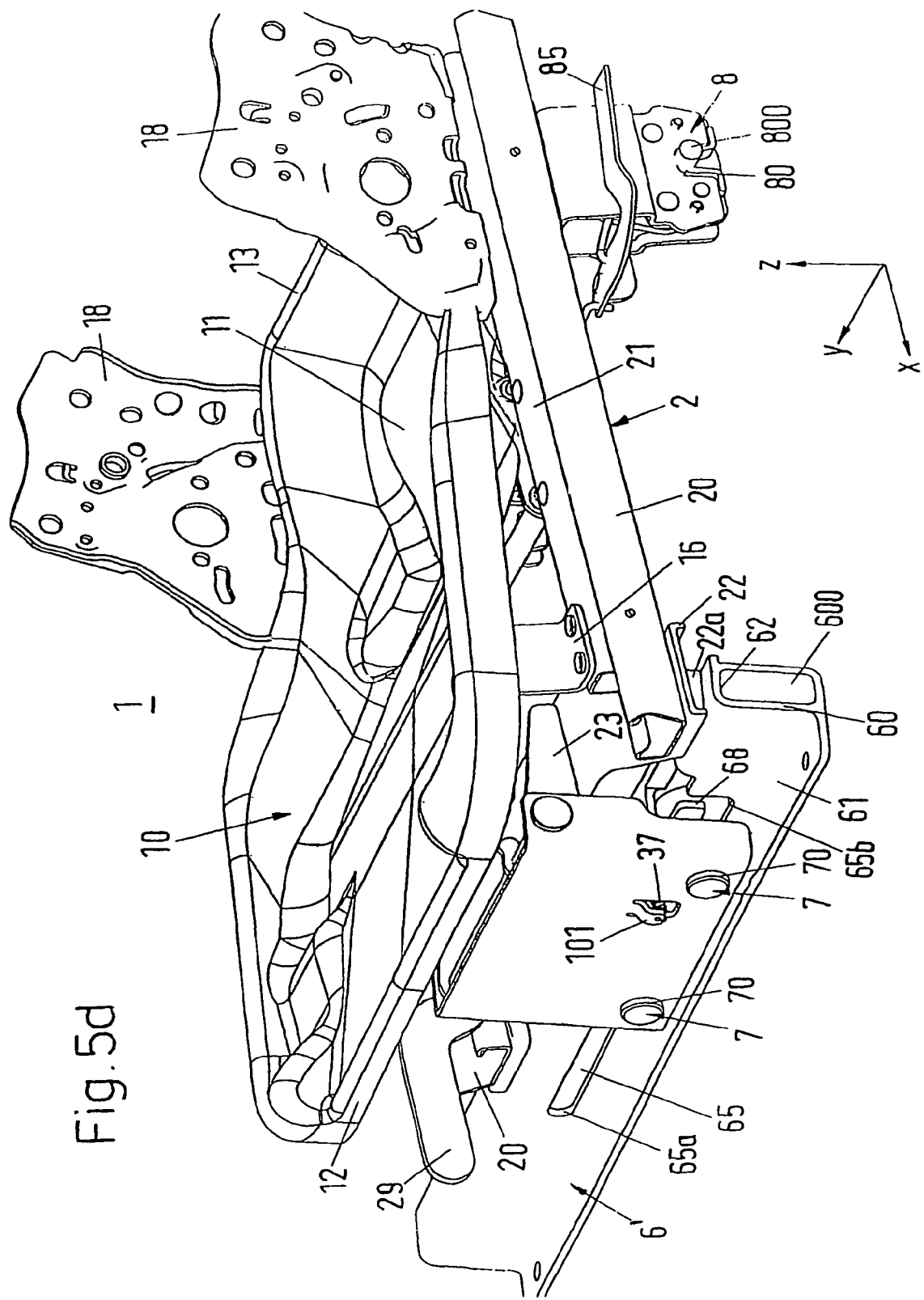
Figure 6A:
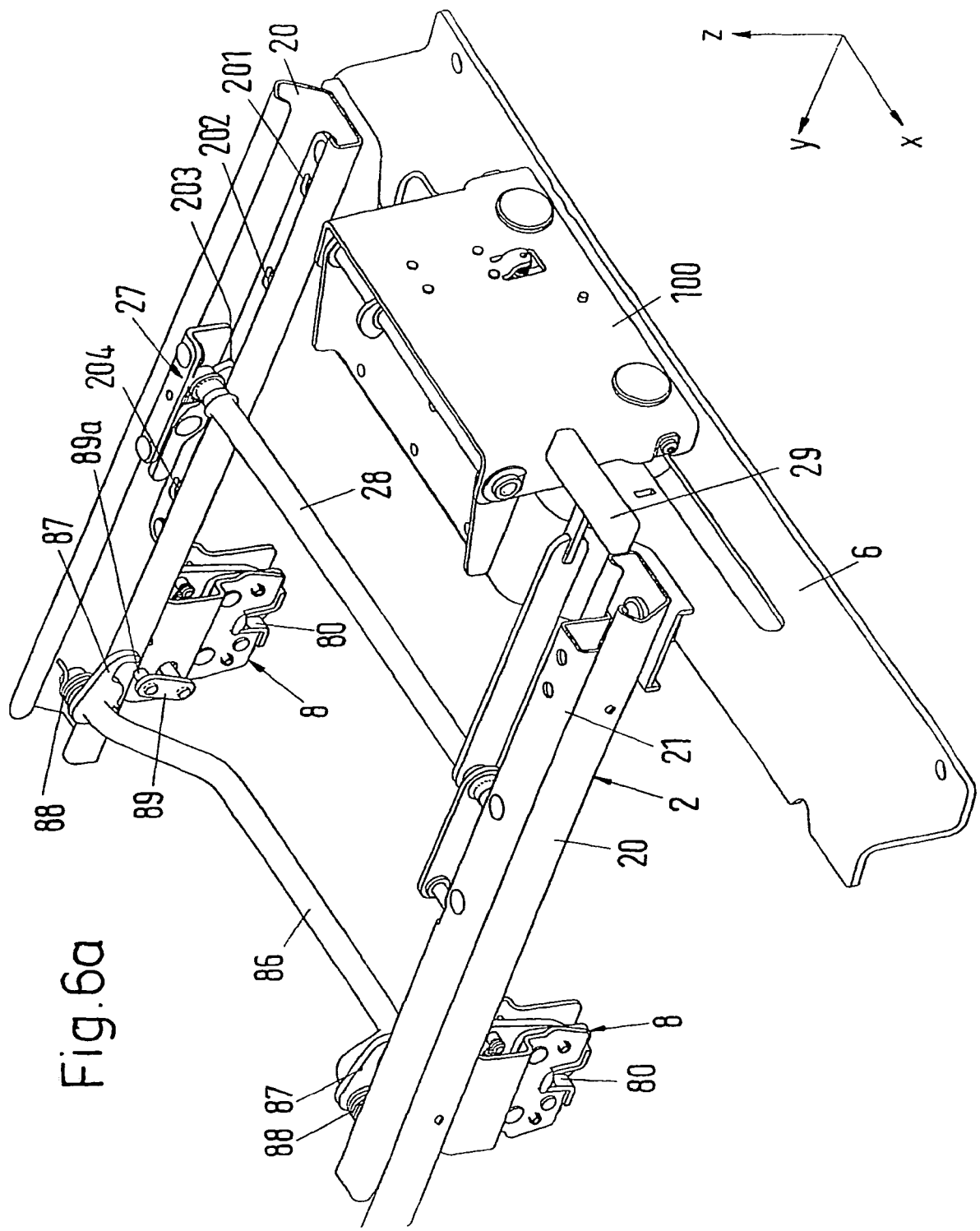
Figure 6B:
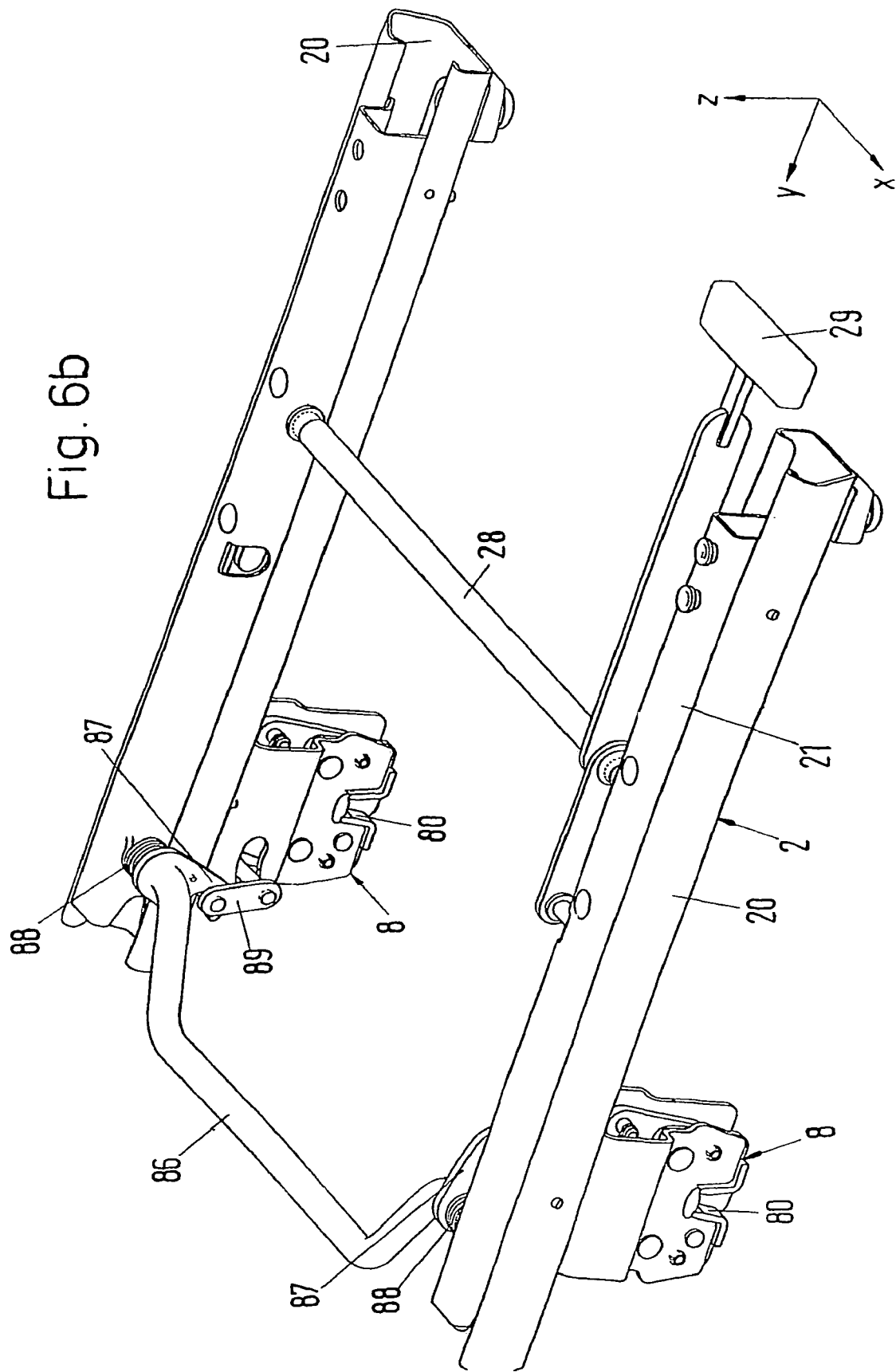

FIG. 5*d* shows a variation of the seat module of FIGS. 5*a* to 5*c* wherein the transverse guide has a tubular section;

FIG. 6*a* shows a perspective view of a seat base with a seat longitudinal guide in which the seat base can be folded into a substantially vertical position only in certain adjustment positions of the longitudinal guide;

FIG. 6*b* shows another perspective view of the embodiment of the seat base shown in FIG. 6*a*.

Figure 6C:
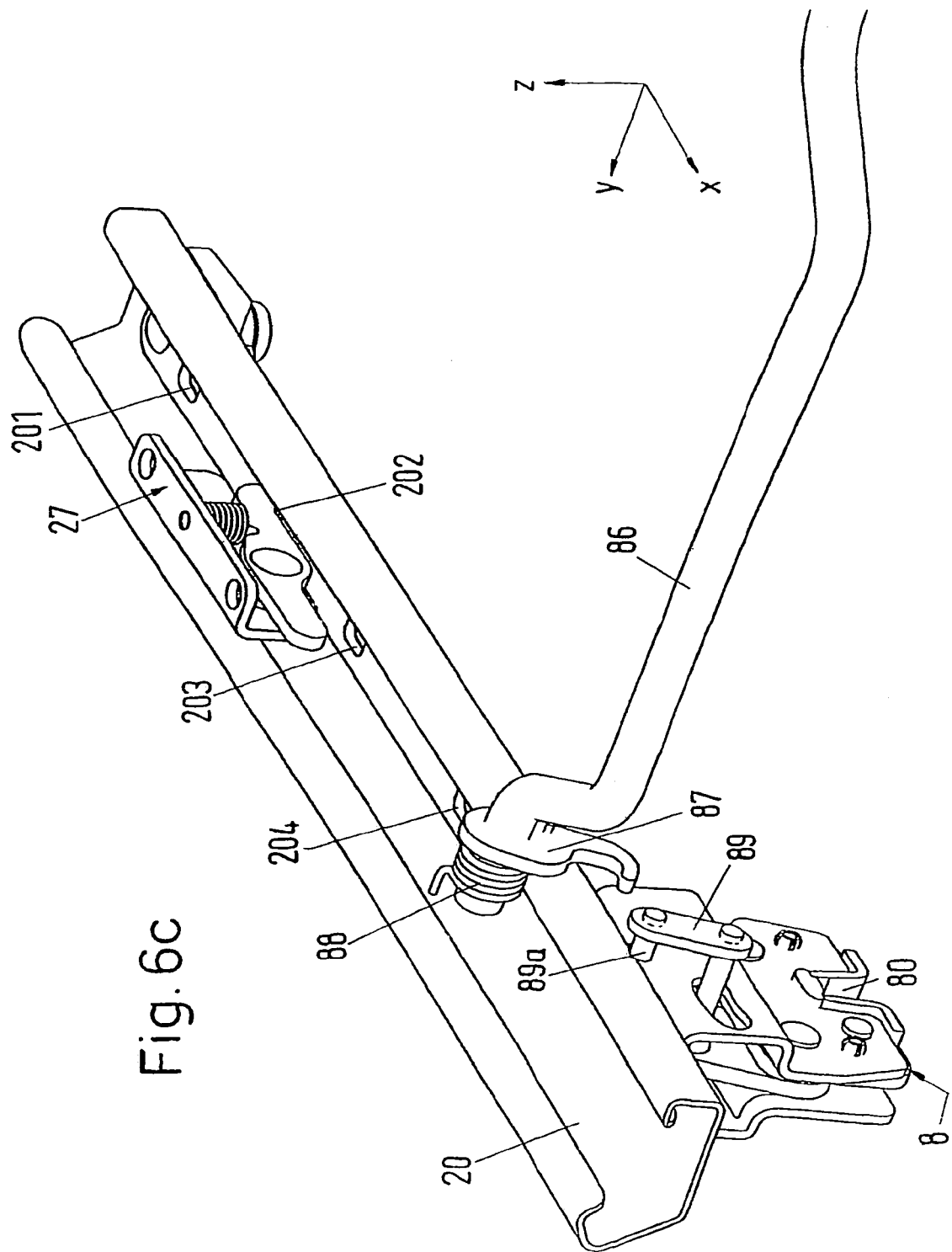

FIG. 6*c* shows an enlarged view of a section of the seat base of FIGS. 6*a* and 6*b*.

FIG. 1*a* shows a seat module that has a vehicle seat 1, which can be moved both horizontally in the longitudinal direction x of the seat (corresponding to the longitudinal direction of the vehicle) and across the same in the y-direction.

Of the seat structure that receives the vehicle occupants, only a seat section 10 is shown in FIG. 1*a* that is formed as a seat pan and defines a seat surface 11 as well as a front and rear seat edge 12 and 13. A seat cushion (not shown) is held by this seat pan 10.

The seat pan 10 is mounted on a longitudinal seat adjuster which comprises a longitudinal seat guide (rail guide 2) consisting of two pairs of rails 20, 21. The two pairs of rails 20, 21 are mounted on either side of the seat pan 10 and consist of two rails 20, 21 which are displaceable relative to each other in the longitudinal direction x of the seat and of which the one is connected to the seat pan 10 (for example through a vertical seat adjuster) and the other is connected to the floor of the vehicle body. The rail guide 2 and the elements through which the seat pan 10 is connected to the rail guide 2 (vertically and incline adjustable where required) form a seat base of the seat 1.

A seat incline adjuster 9 is shown diagrammatically in the region of the front edge 12 of the seat pan 10 and serves to adjust the height of the front edge 12 of the seat pan 10 and is connected through a holding plate 25 provided with holding angles 26 to the two rails 21 (upper rails) on the seat side of the rail guide 2.

The body-side rails 20 (lower rails) of the rail guide 2 have in the region of their lower ends fixing devices in the form of fixing blocks 8 which serve for fixing the body-side rails 20 to the floor of the vehicle. For this the fixing blocks 8 are each provided with a recess 80 in which a corresponding fixing bolt on the vehicle floor can engage.

The front end of the two body-side rails of the longitudinal seat adjuster 2 are each fitted with holding angles 24 which support guide elements 5 which engage round a tubular-shaped transverse guide 4. The transverse guide 4 extends horizontally across the longitudinal direction x of the seat in the y-direction. It is fixed at its two end sides on fixing angles 45 and 46 through which it can be connected to the floor of a vehicle body.

In the embodiment according to FIG. 1*a* the transverse guide 4 is shown diagrammatically such that it can receive just one vehicle seat 1. In general, however, the transverse guide 4 is of such length that it is suitable for receiving two or three vehicle seats. These seats can in particular form the rear seat bench of a vehicle.

The transverse guide 4 has in the extension direction two sections 40, 42 with a circular cross-section. Each of these two sections 40, 42 is thereby associated with each one of the guide elements 5, which engage round the transverse guide 4. The cross-section of these two guide sections 40, 42 is selected so that the seat can be moved in the y-direction by means of the guide elements 5 on these two sections 40, 42 of the transverse guide 4. The vehicle seat 1 can hereby be moved in the y-direction into different positions of use. In order to lock the seat in the different positions of use, corresponding fixing bolts can be provided on the side of the vehicle floor in order to engage in the recesses 80 of the fixing blocks 8.

The guide elements 5 engage round the transverse guide 4 in the region of its guide sections 40, 42 each time at an angle of more than 180° so that a positive locking connection is produced between the guide elements 5 and the transverse guide 4 in the region of the relevant guide sections 40, 42.

Each of the two guide sections 40, 42 of the transverse guide 4 on which the guide elements 5 are displaceable is adjoined by a section 41, 43 having a substantially oval cross-section. The cross-sectional surface of these removal sections 41, 43 is reduced compared with the cross-sectional surface of the two guide sections 40, 42. This enables the seat 1 to be detached from the transverse guide 4 when the seat 1 has been moved along the transverse guide 4 into a position in which the two guide elements 5 on the seat side engage round the transverse guide 4 in the region of one of the removal sections 41, 43. A requirement for this is in any case that the seat pan 10 was previously folded with the longitudinal seat guide 2 into a substantially vehicle position. This is possible since the two guide elements 5 are mounted for swivel movement on the transverse guide 4.

The transverse guide 4 defines at the same time a swivel axis 3 about which the seat pan 10 can be folded together with the rail guide 2 into a substantially vertical position. Obviously prior to tipping round the seat pan 10 the connection between the fixing blocks 8 and the associated fixing bolts on the body side have to be released. If the seat pan 10 has been tipped about the swivel axis 3 provided for this into a substantially vertical position and the two guide elements 5 engage round the transverse guide 4 each in the region of one of the removal sections 41, 43 then the vehicle seat 1 can be detached upwards (in the z-direction) from the transverse guide 4 perpendicular to the extension direction of same. This is possible because the cross-section of the oval removal sections 41, 34 of the transverse guide 4 is selected so that the guide elements 5 can be withdrawn from the removal sections 41, 3 of the transverse guide 4 if previously the guide elements 5 have been swivelled about roughly 90° (as the seat pan 10 is folded round into a substantially vertical position.)

Tipping the seat pan 10 round into a substantially vertical position can obviously also be carried out if the guide elements 5 engage not just round one of the removal sections 41, 43 but round one of the guide sections 40, 42 of the transverse guide 4. In this case tipping the seat pan 10 round into a substantially vertical position does not however result in the seat 1 being able to be removed from the transverse guide 4. For in the region of the guide sections 40, 42 the transverse guide 4 has a circular cross-section so that the guide elements 5 also after swivelling round 90° engage with positive locking action round the guide sections 40, 42 as before.

FIG. 1b shows a cross-section through the transverse guide 4 in the region of one of the removal sections 43. It can be seen that the removal section 43 has in the vertical direction (z-direction) the same extension as the guide section 42 of the transverse guide 4 behind it, whilst in the horizontal direction (x-direction), the extension of the removal section 43 is considerably less than the extension of the guide section 42 of the transverse guide 4.

FIG. 1b shows furthermore a guide element 5 engaging round the transverse guide 4, namely after this guide element 5 was swivelled 90° into a position which corresponds to a substantially vertical position of the seat pan.

The guide element 5 consists of a base 50 and two arms 51, 52 projecting vertically up from same and having angled end sections 53, 54. On its inner side facing the transverse guide 4 the guide element 5 has a plastics coating 55 which has on its surface studs 56 which adjoin the surface of the guide section 42 of the transverse guide 4. Rattle-free bearing of the seat on the transverse guide 4 through the guide elements 5 is hereby achieved.

By means of the angled end sections 53, 54 the guide element 5 engages round the transverse guide 4 in the region of the guide section 42 at an angle of more than 180° so that a positive locking connection is produced between the guide element 5 and the associated guide section 42.

If the guide element 5 however is located on the removal section 43 then this can be removed in the vertical direction (z-direction) from the removal section 43. For the extension of the removal section 43 in the horizontal direction (x-direction) is less than the removal opening E which extends between the two angled end sections 53, 54 of the guide element 5.

From FIG. 1b it is furthermore clear that removing the guide element 5 from the transverse guide 4 is not possible before the seat pan 10 (see FIG. 1a) has been swivelled into a substantially vertical position. For the extension of the removal section 43 in the vertical direction (z-direction) is greater than the extension of the removal opening E of the guide element 5 in this direction. Thus detaching the guide element 5 from the removal sections 43 of the transverse guide 5 is only then possible if the guide element 5 has been swivelled into a position in which the guide element 5 is aligned relative to the removal section 43 such that the guide element can be detached vertically (z-direction) from the removal section 43.

FIG. 1c shows a modification of the embodiment of FIG. 1a wherein the guide elements 5 which are mounted for displacement and swivel movement on the transverse guide, are aligned such that the seat 1 can be detached from the transverse guide 4 when the guide elements 5 are located on the removal sections 41, 43 without the seat pan 10 having been previously folded into a substantially vertical position. In other words, the guide elements 5 are located in the position of use (horizontal position) of the seat pan 10 in a position swivelled round 90° relative to the transverse guide compared with the embodiment of FIG. 1a.

Apart from the fact that in FIG. 1c the connection between the body-side rails 20 of the rail guide 2 and the guide elements 5 is not shown in further detail, the embodiment of FIG. 1c corresponds elsewhere to the embodiment according to FIG. 1a. Reference is thus made to this.

Figure 2A:
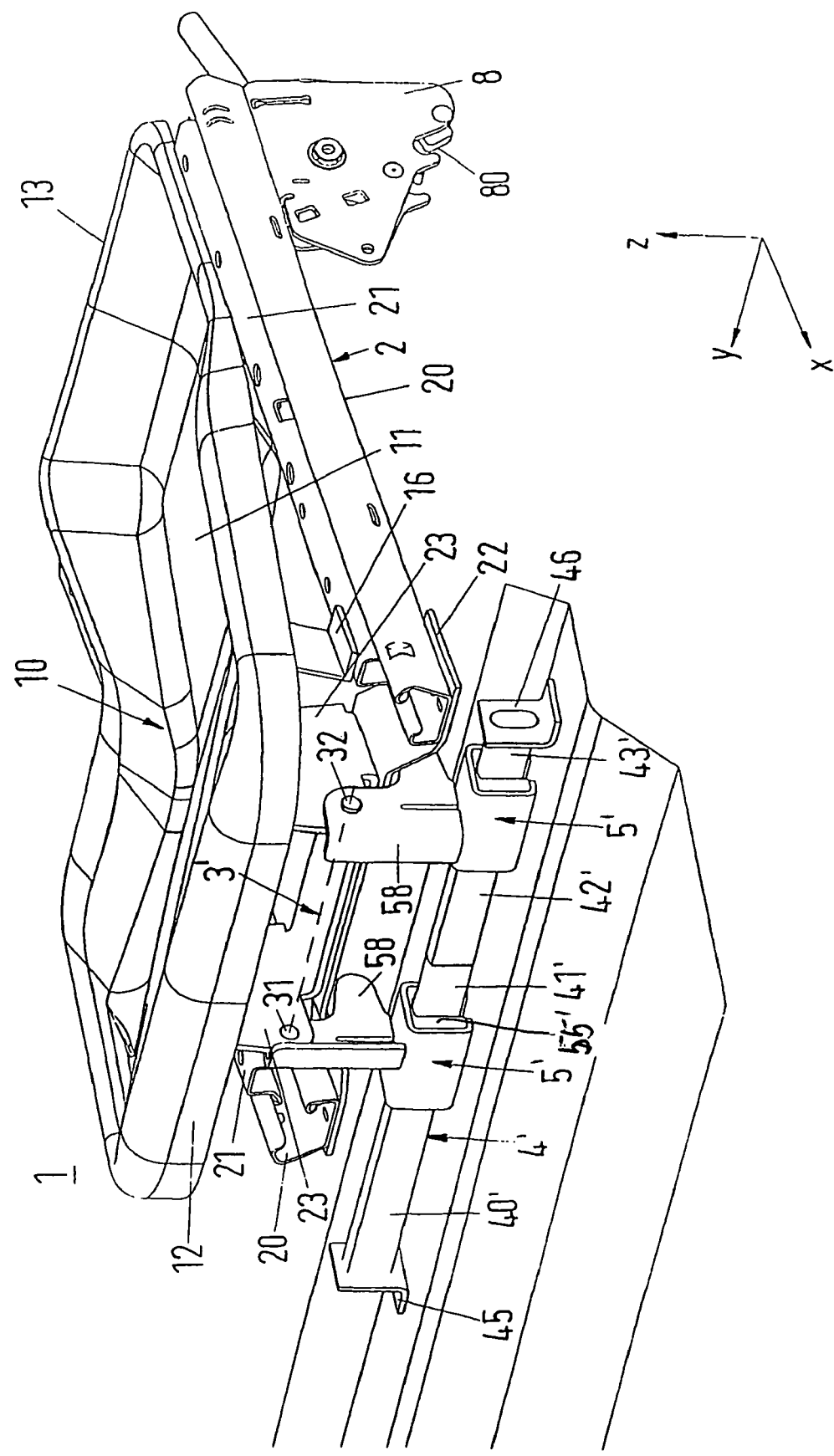
FIG. 2a shows a further modification of the embodiment of FIG. 1a in which the seat can be detached from the transverse guide without swivelling the seat surface.

With the embodiment of a seat module illustrated in FIG. 2a the seat pan 10, the rail guide 2 and the fixing device 8 correspond to the corresponding structural groups of FIG. 1a. Differences here are in the design of the transverse guide 4', the associated guide elements 5' and the swivel axis 3' about which the seat pan 10 can swivel.

In the present example the guide sections 40', 42' of the transverse guide 4' are formed with a substantially semi-circular cross-section; that is the guide sections 40', 42' each have a flattened planar surface. The plastics coating 55' with which the guide elements 5' are provided on their inner side is suitably adapted to this. It has according to FIG. 2b a flat inner surface 57 associated with the flattened surface of the guide sections 40', 42'. The transverse guide 4' is hereby engaged in the region of its guide sections 40', 42' by the guide elements 5' so that it is not possible for the guide elements 5' to swivel about the transverse guide 4'.

This also applies in the region of the oval shaped removal sections 41', 43'. For if the guide elements 5' are located on the oval shaped removal sections 41', 43' then the flat inner surface 57 of the plastics coating 55' also adjoins here against a side face of the corresponding oval so that the guide elements 5' are to able to turn relative to the transverse guide 4'.

Furthermore here as with the embodiment according to FIG. 1c the transverse guide 4' and the associated guide elements 5' are configured and arranged so that the guide elements 5' and thus the entire seat 1 can be removed from the transverse guide 4' if the seat pan 10 is located in its substantially horizontal position of use.

A further difference in respect of the embodiment according to FIG. 1c is that here the seat pan 10 does not swivel about an axis defined by the transverse guide 4' but swivels about a separate swivel axis 3' and can thereby fold into a substantially vertical position. For this, bearing blocks 58 protrude perpendicularly up from the two guide elements 5' (in the z-direction) and hold bolts 31, 32 which define a swivel axis 3' for the seat pan 10. An angled section 23 of a sheet metal part is mounted to swivel on each of the two bearing bolts 31, 32 and in turn is fixed on a holding plate 22 which is connected to the body-side rails 20 of the longitudinal seat guide 2. The entire arrangement consisting of the seat pan 10 and the rail guide 2 is hereby able to swivel about the axis 3' defined through the bolts 31, 32.

In short with the embodiment according to FIG. 2a the swivel axis 3' is independent of the transverse guide 4'; it does, however, run parallel to it in the region of the front seat edge 12.

FIG. 2a shows furthermore a retaining angle 16 which protrudes up from the seat-side rail 21 of the rail pair 20, 21 of the rail guide 2. This retaining angle serves to establish the connection between the seat-side rail 21 and the seat pan 10. The connection is preferably vertically adjustable through suitable levers.

Figure 3B:
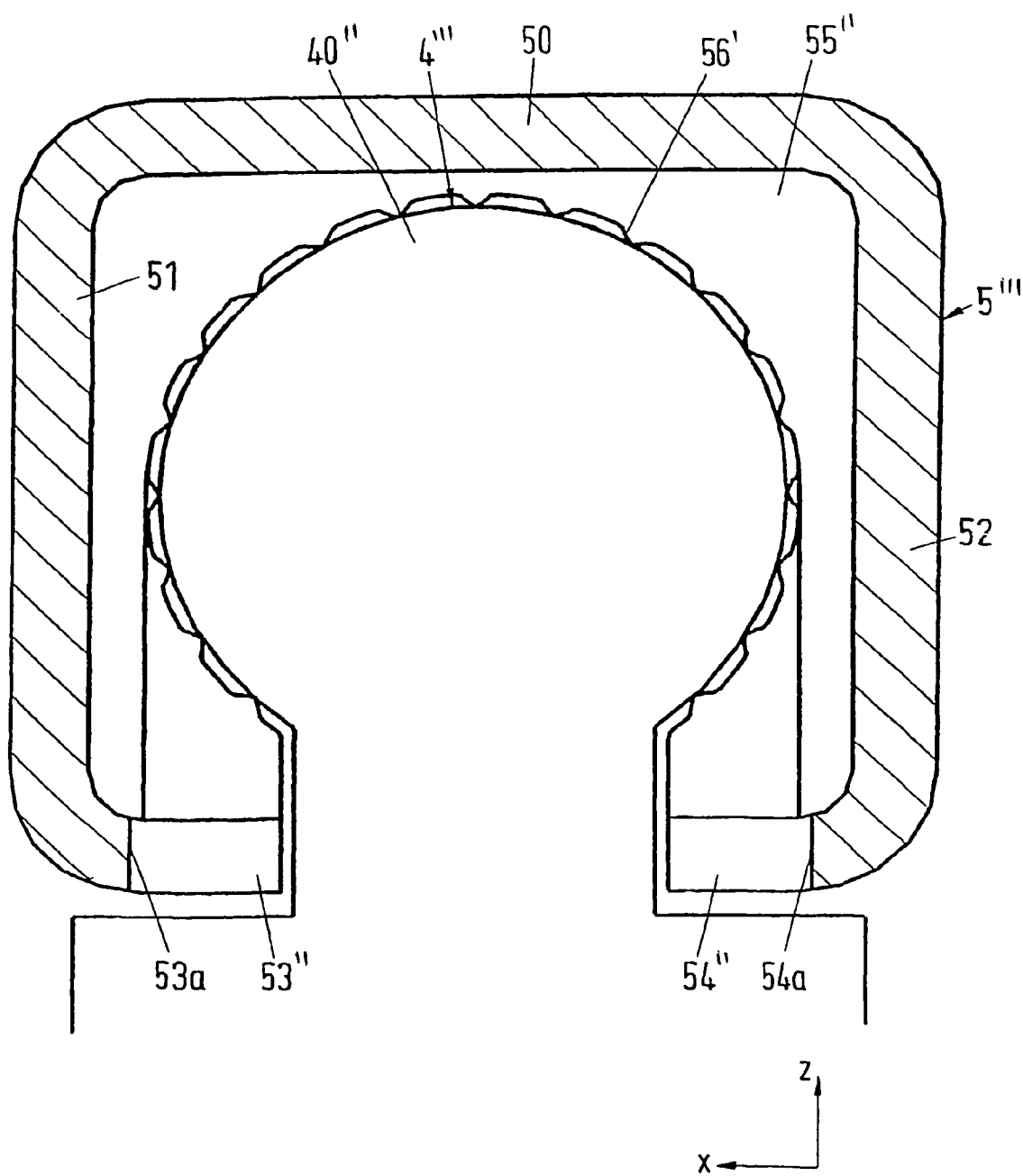
FIG. 3b shows a cross-section through yet another embodiment of the transverse guide.

Two further cross-sections through a transverse guide are shown in FIGS. 3a and 3b.

With the embodiment according to FIG. 3a the transverse guide 4" has a substantially circular cross-section and is provided with two guide slits 14 which extend in the extension direction y of the transverse guide 4" and in which the guide elements 5" can engage by their angled ends 53', 54'. The guide slits 14 are, however, only provided in the guide sections 49 of the transverse guide 4". In addition there are—as also in the preceding embodiments—removal sections 47' which have a reduced cross-section compared with the guide sections 49. In the present example a free cut area is formed in the region of the removal section 47' so that either side of the removal section 47' there are two limiting walls 48' which extend perpendicular (in the z-direction). The distance between the two side limiting walls 48' is less than the distance between the two end sections 53', 54' of the guide element 5" so that the guide element can be removed from the transverse guide 4" by means of the opening E' when the guide element 5" is located on the removal section 47' of the transverse guide 4".

With the embodiment according to FIG. 3b the guide elements 5''' themselves have the removal sections which With the embodiment according to FIG. 3b the guide elements 5''' themselves have the removal sections which are to enable the guide elements and thus the entire seat to be removed from the transverse guide 4'''. The removal sections are currently formed by shortening the angled end sections 53", 54" of the guide elements 5''' in some areas. In these areas, the distance between the limiting walls 53a, 54a of the angled end sections in the longitudinal direction x of the seat is less than the extension of the base body 40" of the transverse guide 4''' in this direction. Therefore the guide elements 5''' can be removed from the transverse guide 4''' if they have been moved into a position on the transverse guide in which they are still only in contact with the guide 4''' through their removal sections.

Figure 4:
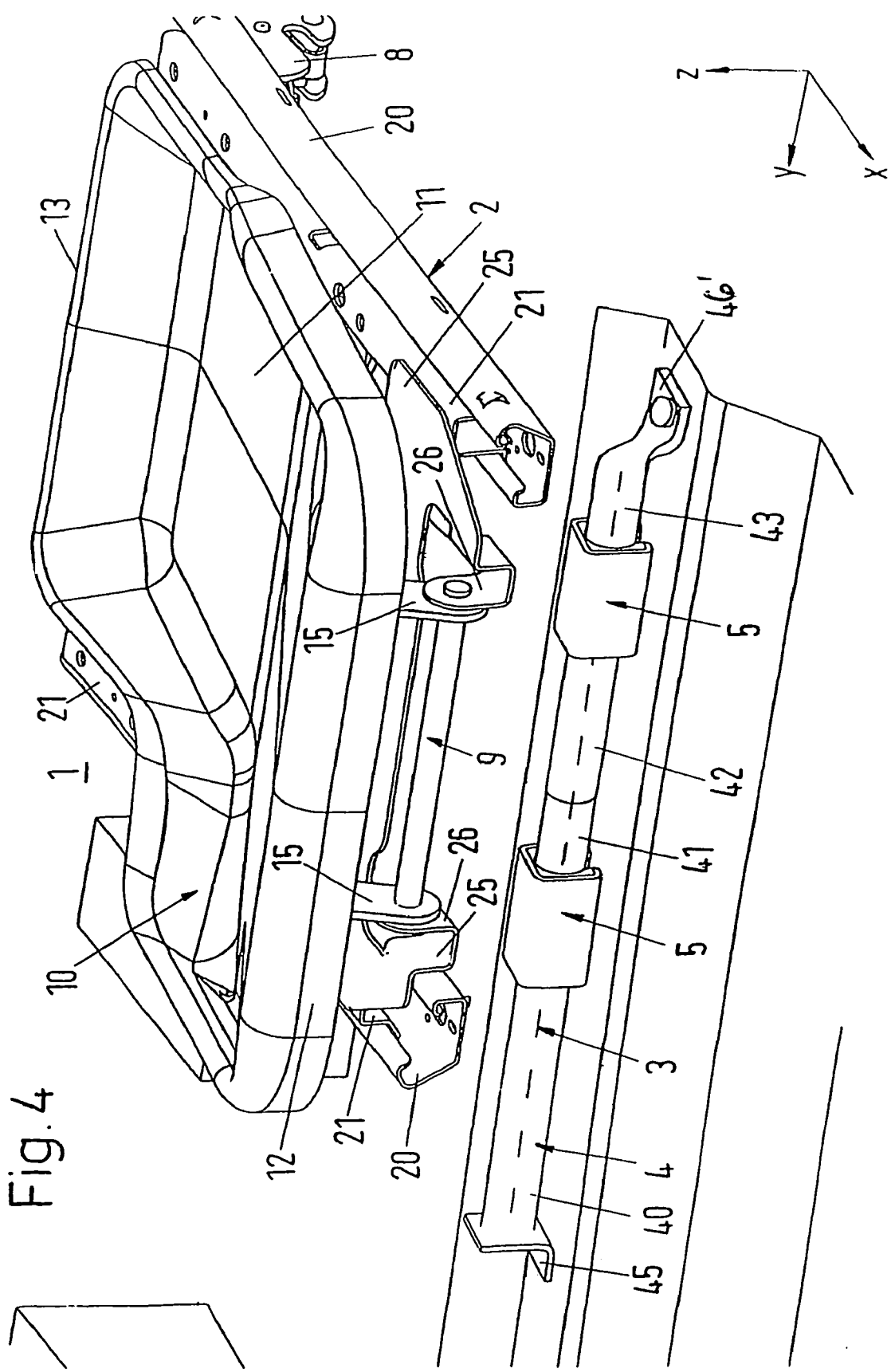
FIG. 4 shows a modification of the embodiment of FIG. 1*a* in which the seat can be moved beyond the end side for detachment from the transverse guide.

FIG. 4 shows an embodiment of a seat module which is substantially identical with the seat module of FIG. 1c. The sole difference is in the shape of the end side 46' of the transverse guide 4"". According to FIG. 4 an end side 46' of the transverse guide is flattened out and is thereby formed so that the guide elements 5 by sliding in the y-direction can be pushed down on this end side 46' from the transverse guide. In this case removing the guide elements 5 and thus the seat from the transverse guide 4"" does not happen perpendicular to their extension direction but rather in the extension direction y of the transverse guide 4"". The guide elements 5 are simply pushed down from the transverse guide 4"" in the extension direction y thereof whereby they are moved up to the flattened end side 46' of the transverse guide 4"" and moved still further there in the y-direction.

The embodiment illustrated in FIGS. 5a to 5c differs in several respects from the previous embodiments.

Thus additional fitments 18 are shown in FIGS. 5a to 5c which serve for the swivel mounting of a backrest of the seat 1. Comparable fitments can also be provided also in the seat modules illustrated in FIGS. 1 to 4.

The illustration of the fixing blocks 8 which serve to fix the lower rails 20 of the rail guide 2 on the vehicle floor is completed by fixing bolts 800 on the side of the body floor which engage in recesses 80 of the fixing blocks 8 as well as by an unlocking lever 85 for unlocking the fixing device which is formed by the fixing blocks 8. The unlocking lever 85 is directly assigned to one of the fixing blocks 8 and is coupled to the other fixing block 8 by a transverse bar 85a (shown in FIG. 5c).

Furthermore, an operating lever 29 for the longitudinal seat adjustment is shown with which the pairs of rails 20, 21 of the rail guide 2 can be released for adjusting the longitudinal position the seat.

Apart from these additions compared with the illustrations of FIGS. 1 to 4 there are also clear differences in the configuration of the transverse guide as well as in the configuration of the swivel axis about which the seat pan 10 can fold into a substantially perpendicular position.

The transverse guide 6 is here formed by a guide rail with a substantially S-shaped guide profile. The guide profile has a substantially vertically (z) extending base area 60 and two angled sections 61, 62 which protrude from the ends of the base area 60 in different directions.

In the base area 60 of the transverse guide 6 a slide guide 65 runs in the extension direction y of the transverse guide 6 and serves to guide the guide elements 7 on the seat side along the transverse guide 6.

On the seat side there are two guide elements 7 which are spaced from each other along the extension direction y of the transverse guide 6 and which each consist of two runners 71, 72 which are arranged one behind the other in the longitudinal direction x of the seat. The two runners 71, 72 are each mounted on a common axial bolt 70 which is guided in the slide guide 65 of the transverse guide 6.

The runners 71, 72 of each of the guide elements 7 are each supported in different directions vertically on the guide profile of the transverse guide 6. The front runners 71 of the guide element 7 are each supported down (opposite the z-direction) against the one angled section 61 of the transverse guide 6. The rear runners 72 are each supported upwards (along the z-direction) on the other angled section 62 of the transverse guide 6. A rattle-free bearing of the guide elements 7 in the transverse guide 6 is hereby achieved. At the same time the runners 71, 72 ensure a low-friction adjustment of the guide elements 7 along the transverse element 6.

As can be seen in particular from FIG. 5c in the upper angled section 62 of the transverse guide 6 there are four conical sockets 63a, 63b spaced out from each other in the extension direction of the transverse guide 6 and associated with two fixing pins 22b on the seat side. The fixing pins 22b thereby protrude down from each one wedge 22a which is fixed on a holding plate 22 which extends from the one rail 20 of the rail guide 2 on the body side to the other rail 20 on the body side and which is connected to each of the two rails 20 on the body side. The conical sockets 63a, 63b define two positions of use of the seat 1 relative to the transverse guide 6 whereby in each of the two positions of use the two fixing pins 22a engage in two conical sockets 63a, 63b and hereby secure the seat 1 against displacement in the extension direction y of the transverse guide 6.

In addition the seat 1 is fixed in the relevant position of use by means of the fixing blocks 8 in the area of the rear end of the guide rails 20 of the body side. For this fixing bolts 800 have to be arranged on the bottom of the body so that in each of the two positions of use the sockets 80 of the fixing blocks 8 provided for this purpose can each receive a fixing bolt 800.

As a result of fixing the seat 1 relative to the transverse guide 6 in this way not only through the fixing blocks 8 but also through the fixing points 22a which engage in conical sockets 63a, 63b in the transverse guide 6, displacement of the seat 1 along the transverse guide 6 from one position of use into another only takes place when the fixing device formed by the fixing blocks 8 has been unlocked by means of the unlocking lever 85 provided for this purpose at the same time as the fixing pins 22b are out of engagement with the conical sockets 63a, 63b. In order to bring the fixing pins 22b out of engagement with the conical sockets 63a, 63b, the seat 1 (thus e.g. the seat pan 10 and the rail guide 2) has to be swivelled about a swivel axis 3' which is provided for it. In order to prepare for the swivel action on the one hand the fixing device formed by the fixing blocks 8 has to be unlocked and on the other the back rest (not shown in FIGS. 5a to 5c) is folded towards the seat surface 11 of the seat pan 10. The seat pan 20 can then be folded together with the rail guide 2 about the swivel axis 3' in the direction of a substantially vertical position.

The swivel axis 3' is formed by a cross bar 30 which is mounted by its ends in angled sections 23 which are fixed on the retaining plate 22 and protrude upwards from same.

A locking element 35 which is provided with a hook 36 is mounted for swivel movement on the cross bar 30 forming the swivel axis 3' and when the seat pan 10 is swivelled into a vertical position comes into engagement, against the pretension of a spring element 37, with a slit 64a, 64b provided for this purpose in the base area 60 of the transverse guide 6 through a control member 38 coupled to the seat pan 10. In the base area 60 of the transverse guide 6 there are two slits 64a, 64b which are spaced from each other in the extension direction y of the transverse guide 6 and which are each associated with one of the two positions of use of the seat 1 in relation to the transverse guide 6. This means that the locking element 35 engages by its locking hook 36 into one of the two slits 64a, 64b when the seat pan 10 is swivelled out of one position of use of the seat 1 into a vertical position. if on the other hand the seat pan 10 is not completely tipped into its vertical position but is only lifted into an inclined position, e.g. through swivelling between 15 and 75° about the swivel axis 3', then the fixing pins 22b do indeed move out of engagement with the associated conical sockets 63a, 63b; but there is still no engagement of the locking hook 36 in one of the slits 64a, 64b. For this the entire assembly is designed so that only when the seat pan 10 swivels into a substantially vertical position, eg round at least 75° is the action of the spring element 37 overcome so far that the locking hook 36 can engage in the associated slit 64a or 64b.

Thus if the seat pan 10 after swivelling about the axis 3' is located in a diagonal position then on the one hand the fixing pins 22b are out of engagement with the conical sockets 63a, 63b and on the other the locking hook 36 is not yet in engagement with the slits 64a, 64b. In this state the seat 1 can be moved relative to the transverse guide 6 along its extension direction y. The runners 71, 72 hereby slide on the guide profile of the transverse guide 6 and the axial bolts 70 of the guide elements 7 are guided in the guide slit 65 of the transverse guide 6.

By sliding the seat 1 along the transverse guide 6 this can not only be displaced from one position of use into the other but it can also be brought into a removal position in which the guide elements 7 can be detached from the transverse guide 6. The removal position in the transverse guide is formed by two removal slots 66, 68 spaced from each other in the extension direction y of the transverse guide 6 in the base area 60 of the latter as well as by two removal openings 67, 69 provided above the slots 66, 68 in the upper angled section 62 of the transverse guide 6. The removal slots 66, 68 serve to unthread the axial bolt 70 and the removal openings 67, 69 serve to remove the rear runners 72 of the guide elements 7. The rear runners 72 which outside of the removal position engage behind the upper angled section 62 of the transverse guide 6 can hereby be brought through the removal openings 67, 69 vertically upwards (in the z-direction) out of engagement with the transverse guide 6.

Finding the removal position is made easier through a side end stop 65b of the slide guide 65. The seat 1 is located in a removal position if the axial bolt 70 of the one guide element 7 adjoins this side stop 65b. The other side end stop of the slide guide 65 corresponds on the other hand to one of the two positions of use of the seat 1.

If after swivelling the seat pan 10 into an inclined (diagonal) position the seat was not changed into the removal position but was moved from one position of use into the other then the seat after finding the other position of use is folded again into its position of use (substantially horizontal position of the seat pan 10) whereby the fixing pins 22b engage in the corresponding conical sockets 63a or 63b. The wedges 22a on which the fixing pins 22b are fixed are thereby pushed between the upper angled section 62 of the transverse guide 6 and the connecting plate 22 whereby a rattle-free bearing of the rail guide 2 on the transverse guide 6 is guaranteed.

From FIGS. 5a and 5c it is further apparent that a cover or base plate 100 is provided on the front side of the transverse guide 6. This serves on the one hand to hold the axial bolt 70 of the guide elements 7. On the other it has a bearing section 101 for bearing the spring element 37 which pretensions the locking element 35 against the locking position. It is hereby ensured that the locking hook 36 of the locking element 35 can only then engage in one of the slits 64a, 64b if the seat pan 10 has in one of its two positions of use been folded from the substantially horizontal position of use into a substantially perpendicular position.

The cover plate 100 which is not shown in FIG. 5b is fixed on the cross bar 30 which forms the swivel axis 3' for the seat 1.

FIG. 5d shows a further development of the embodiment of FIGS. 5a to 5c. The single difference is that here the transverse guide 6' has for guiding the rear runners 72 of the guide elements 7 a guide tube 600 whose limiting walls are formed on one side by the base area 60 and the upper angled section 62 of the transverse guide 6' and on the other by two additional side walls.

FIGS. 6a to 6c show a further completion of the embodiment of FIGS. 5a to 5b. This relates to the configuration of the rail guide 2 and in particular its coupling to the fixing device consisting of fixing blocks 8 through which the rails 20 of the rail guide 2 on the body side can be connected to the vehicle floor.

FIGS. 6a to 6c show the longitudinal seat adjuster in greater detail than in the preceding figures. The longitudinal seat adjuster comprises in addition to the two pairs of rails 20, 21 arranged parallel to each other to form the rail guide 2, in particular also a locking device 27 for locking the rails 20, 21 in the different longitudinal positions. To this end the locking device 27 is connected to one of the rails 21 (upper rails) on the seat side and has one or more locking teeth (not shown) which can engage in corresponding detent openings 201, 202, 203 or 204 of the rail 20 on the body side (lower rail). The seat-side rail 21 is hereby locked relative to the body-side rail 20. A locking mechanism 27 of this kind with associated detect openings 201 to 204 is normally associated not only with one of the rail pairs 20, 21 but with each of the two rail pairs 20, 21 in order to produce a reliable locking action. The two locking mechanisms 27 are coupled together through a connecting shaft 28 and can be unlocked jointly through an operating lever 29 which is mounted rotationally secured on the connecting shaft 28.

In the region of the rear end of each of the two body-side rails 20 of the rail guide 2 there is a fixing block 8 through which the corresponding body-side rail 20 can be connected to the floor of the vehicle body. To this end the fixing blocks 8 each have a socket 80 in which a fixing bolt on the body side can engage.

In order to unlock the fixing device an actuating lever 86 is provided which is mounted for swivel movement on the two seat-side rails 21 of the rail guide 2 and which is pretensioned by means of two spring elements 88 mounted in the region of its ends towards the unlocking position in which the actuating lever 86 generates the unlocking of the fixing device.

The actuating lever 86 can, for unlocking the fixing device, be coupled to the fixing blocks 8 through two entrainment hooks 87 which are mounted rotationally secured in the region of its ends. For this, each of the two fixing blocks 8 has a follower 89 with an entrainment bolt 89a which can be engaged by the associated follower hook 87 of the actuating lever 86 so that during swivel movement of the actuating lever 86, the fixing device can be unlocked through the entrainment hook 87 and the associated follower 89. This means that the corresponding fixing bolt on the body floor side is released in the associated socket 80 of the fixing bolt 8.

Since the actuating lever 86 and the associated follower hooks 87 are mounted on the rails 21 on the seat side whilst the fixing blocks 8 with the associated followers 89 are each mounted on the rails 20 on the body side, a coupling between the follower hooks 87 and the followers 89 for unlocking the fixing device is only possible in certain longitudinal positions of the seat, that is only in certain positions of the rails 21 on the seat side relative to the rails 20 on the body side. Preferably the actuating lever 86 is mounted on the rails 21 on the seat side so that the follower hooks 87 can only then be brought into engagement with the associated followers 89 when the seat is located in a rear longitudinal position, more particularly the rearmost longitudinal position.

This hereby prevents the fixing device from being unlocked and thus the seat being folded down in order to bring the seat pan into a substantially vertical position if the seat is just located in one of the front longitudinal positions of the seat. For in this state there would be the risk that the seat pan during tipping into a substantially vertical position strikes by its front edge the vehicle floor, with the resulting risk of damage to the seat pan and also the risk of injury to the operator. Furthermore the operating comfort is increased if the seat can only then fold down when such tipping (as a result of a suitable longitudinal seat position) is readily possible.

The invention claimed is:

1. A seat module comprising:
   at least one vehicle seat having a seat base through which the seat can be connected to a vehicle body;
   a transverse guide, having a first side and a second side, along which the seat can be displaced by means of at least one guide element horizontally transversely to a longitudinal direction of the seat, wherein when the seat is on the first side, the seat is lockable relative to the transverse guide in at least one position of use and when the seat is on the second side, the seat is detachable from the transverse guide,
   wherein the at least one guide element is connected, when the seat is in the at least one position of use, to the transverse guide with positive engagement so that the seat, even if it is unlocked to the vehicle body, cannot be detached from the transverse guide and by sliding the seat along the transverse guide out from the at least one position of use into a removal position, which is different from the at least one position of use, the positive locking connection can be released and the seat can be removed from the transverse guide when the seat is one of inclined and perpendicular to the extension direction (y) of the transverse guide.

2. The seat module according to claim 1, wherein at least one of the transverse guide and the at least one guide element, on a seat side mounted and displaceable on the transverse guide, has a removal section which allows in at least one position of the seat relative to the transverse guide the removal of the seat from the transverse guide when the seat is one of inclined and perpendicular to the extension direction (y) of the transverse guide.

3. The seat module according to claim 2, wherein the at least one guide element engages round the transverse guide and the removal section is formed by a section of the transverse guide that has a reduced cross-section.

4. The seat module according to claim 3, wherein the at least one guide element and the transverse guide interact through a plastics layer.

5. The seat module according to claim 4, wherein the at least one guide element is provided with a plastics coating on its inner side facing the transverse guide in order to enable a rattle-free bearing of the at least one guide element on the transverse guide.

6. The seat module according to claim 2, wherein the transverse guide is formed in cross-section as a profiled part in which the at least one guide element one of engages and is engaged by the at least one guide element and the removal section of the transverse guide has a removal opening.

7. The seat module according to claim 6, wherein the at least one guide element is supported on the transverse guide in two different directions.

8. The seat module according to claim 7, wherein the at least one guide element has at least one of wheels and runners, which are supported in different directions on guide faces of the transverse guide.

9. The seat module according to any one of the preceding claims, wherein the transverse guide comprises a guide tube.

10. The seat module according to claim 1, wherein the transverse guide comprises a guide rail.

11. The seat module according to claim 1, wherein the seat is displaceable along the transverse guide in at least two different positions of use and can be locked in the at least two different positions of use.

12. The seat module according to claim 11, wherein the seat has a fixing device through which the seat can be locked in its at least two different positions of use on the vehicle body.

13. The seat module according to claim 1, wherein securing elements are provided for fixing the seat relative to the transverse guide.

14. The seat module according to claim 13, wherein detent points are provided on the transverse guide and interact with detent elements of the seat for fixing the seat relative to the transverse guide in its at least two different positions of use.

15. The seat module according to claim 1, wherein the seat has a longitudinal seat adjuster which comprises at least one pair of rails extending in a seat longitudinal direction (x) and one rail of the at least one pair of rails on a body side is mounted displaceable on the transverse guide in the extension direction (y) of the transverse guide.

16. The seat module according to claim 1, wherein the transverse guide runs along an edge of a seat face of the seat.

17. The seat module according to claim 1, wherein at least a further seat can be mounted displaceable on the transverse guide.

18. The seat module according to claim 1, wherein a swivel axis is provided about which a seat face of the seat can swivel out from its at least one position of use into a substantially vertical position.

19. The seat module according to claim 18, wherein the swivel axis runs parallel to the transverse guide.

20. The seat module according to claim 16, wherein the swivel axis runs along the same edge of the seat face as the transverse guide.

21. The seat module according to any one of claims 18 to 20, wherein the swivel axis runs at a distance from the transverse guide.

22. The seat module according to claim 18, wherein the seat is only displaceable along the transverse guide when the seat face has been swivelled around the swivel axis out from its at least one position of use.

23. The seat module according to claim 18, wherein the seat can only be detached from the transverse guide when the seat face has been swivelled about the swivel axis out from its at least one position of use.

24. The seat module according to claim 22 or 23, wherein the seat can only be displaced along the transverse guide when the seat face has been swivelled at least a first angular amount about the swivel axis from its at least one position of use, and the seat can only then be removed from the transverse guide when the seat face has been swivelled at least about a second angular amount.

25. The seat module according to claim 18, wherein at least one locking element is provided which, during swivelling of the seat face into a substantially vertical position, locks the seat from moving along the extension direction (y) of the transverse guide.

26. The seat module according to claim 25, wherein a seat section forming the seat face has the at least one locking element which, during swivelling of the seat face into a substantially vertical position, enters into engagement with the transverse guide and thereby locks the seat from moving along the extension direction (y) of the transverse guide.

27. The seat module according to claim 25 or 26, wherein the at least one locking element is resiliently pretensioned towards a locking position in order to prevent locking of the seat through the at least one locking element in the at least one position of use of the seat face.

28. The seat module according to claim 25, wherein a control member is provided which controls the movement of the locking element during swivelling of the seat face.

29. The seat module according to claim 18, wherein at least one wedge is provided on the seat and, when the seat is in the at least one position of use, the at least one wedge is clamped between the seat and transverse guide.

30. The seat module according to claim 1, further comprising a longitudinal seat adjustment for adjusting position of the seat in the longitudinal direction; and
a tipping mechanism for swivelling a seat face out from its at least one position of use into a substantially vertical position, wherein the tipping mechanism is coupled with the longitudinal seat adjustment so that the seat face can only be swivelled into the vertical position when the seat is located in certain predetermined longitudinal positions.

31. The seat module according to claim 30, wherein the longitudinal seat adjustment comprises at least one pair of rails which are displaceable relative to each other in the longitudinal direction (x) of the seat,
wherein at least a first part of the tipping mechanism is coupled to a first rail of the at least one pair of rails and a second part of the tipping mechanism is coupled to a second rail of the at least one pair of rails, and
wherein the first and second parts of the tipping mechanism can only be brought into active connection with each other is certain predeterminable longitudinal positions of the seat in order to be able to fold the seat face.

32. The seat module according to claim 31, wherein the tipping mechanism comprises an unlocking mechanism which serves for unlocking a fixing device of the seat before swivelling the seat face and which is connected on the first part to the first rail and on the second part to the second rail of the at least one pair of rails.

33. The seat module according to claim 32, wherein an actuating element is connected to the second rail for unlocking the fixing device and the actuating element can be brought into active connection with a part of the unlocking mechanism connected to the first rail in order to unlock the fixing device.

34. The seat module according to claim 33, wherein actuating element can be brought into active connection through a hook with a follower of the unlocking mechanism in order to unlock the fixing device.

35. The seat module according to any one of claims 30 to 34, wherein the seat face can only swivel into a substantially vertical position if the seat is located in a rear longitudinal seat position.

36. The seat module according to claim 12, wherein the fixing device is in the form of fixing blocks.

37. The seat module according to claim 16, wherein the edge is a front edge.

38. The seat module according to claim 24, wherein the first angular amount is approximately 15°.

39. The seat module according to claim 24, wherein the second angular amount is approximately 75°.

* * * * *

UNITED STATES PATENT AND TRADEMARK OFFICE
CERTIFICATE OF CORRECTION

PATENT NO. : 7,270,362 B2  Page 1 of 1
APPLICATION NO. : 10/296842
DATED : September 18, 2007
INVENTOR(S) : Peter Rausch et al.

It is certified that error appears in the above-identified patent and that said Letters Patent is hereby corrected as shown below:

In the Claims

| | |
|---|---|
| Column 16, lines 3-4, Claim 30 | Delete "predetermined", Insert --predeterminable-- |
| Column 16, line 15, Claim 31 | Delete "is", Insert --in-- |
| Column 16, line 30, Claim 34 | Insert --the-- before "actuating" |

Signed and Sealed this

Seventeenth Day of June, 2008

JON W. DUDAS
*Director of the United States Patent and Trademark Office*